United States Patent [19]

Ganssmantel

[11] 3,858,007

[45] Dec. 31, 1974

[54] CIRCUIT ARRANGEMENT FOR SYNCHRONIZING PULSE BURSTS

[75] Inventor: Horst Ganssmantel, Backnang, Germany

[73] Assignee: Licentia Patent-Verwaltungs G.m.b.H., Frankfurt, Germany

[22] Filed: Jan. 23, 1973

[21] Appl. No.: 326,042

[30] Foreign Application Priority Data

Jan. 26, 1972 Germany ........................... 2203575

[52] U.S. Cl. ............. 179/15 BS, 325/4, 178/69.5 R

[51] Int. Cl. ............................................ H04j 3/06

[58] Field of Search ..................... 325/4; 179/15 BS; 178/69.5 R

[56] References Cited

UNITED STATES PATENTS 3,678,387 7/1972 Wilson .................................. 325/4

*Primary Examiner*—Ralph D. Blakeslee

*Attorney, Agent, or Firm*—Spencer & Kaye

[57] ABSTRACT

A circuit arrangement for synchronizing pulse bursts and pulse frames in the transmission of pulse coded data. The data is transmitted via directional transponders of a communication satellite using time division multiplexing. A main transponder in a satellite is associated with an antenna which supplies signals received from ground stations thereto and radiates signals, including synchronizing information signals to the ground stations. Circuits are provided at each ground station which respond to the received synchronizing information signals as well as the individual station's own burst signals, these circuits being effective to control the pulse repetition rate (frequency) and the phase of the transmitted pulse bursts at each respective ground station.

3 Claims, 2 Drawing Figures

CIRCUIT ARRANGEMENT FOR SYNCHRONIZING PULSE BURSTS

BACKGROUND OF THE INVENTION

This invention relates to a circuit arrangement for synchronizing the pulse bursts of data transmissions, according to a time division multiplex technique, via a communication satellite having a plurality of directional beam antennas. The present invention relates, more particularly, to a circuit arrangement for synchronizing the pulse bursts and the pulse frames during the transmission of pulse-coded data, using a time division multiplex technique, via directional transponders of a communication satellite whose narrow (spot) beam directional antennas cover, with their respective radiation range and patterns, spatially separated ground stations, either individually and/or in groups.

It is known that the exchange of data between several transmitting and receiving stations can take place simultaneously over the limited frequency band of a relay station. Such relay station can be, for example, the transponder of a communication satellite which receives, multiplexes and amplifies the signals from all transmitting ground stations and retransmits the multiplexed signals over another frequency band. A substantial increase in the transmission capacity and a saving in satellite power can furthermore be realized by disposing the spatially widely separated ground stations, individually, or in groups, within the respective radiation ranges and patterns of the directional beam antennas of the satellite.

For multiple transmission over the individual transponders, a time division multiplex technique, sometimes referred to as multiple access time division (TDMA) may be used, for example, in which each station has assigned to it a distinct, separate pulse burst which takes up a defined phase position within the pulse frame with respect to a reference burst. The defined phase position is produced by phase shifting the binary coded data. The times of the transmission of the respective pulse bursts from all transmitting stations are regulated in such a manner that the respective pulse bursts arrive at the satellite consecutively in time, consideration having been given to the times of travel of the respective pulse bursts to the satellite; thus, no overlaps occur. The position of each of the transmitted pulse bursts relative to the reference burst is regulated, provided that all ground transmitting stations can receive from the satellite the reference pulse burst as well as their own transmitted pulse bursts in their receiving band.

The possibility of reception by a ground station of its own pulse bursts is not assured, however, whenever use is made of directional beam antennas, spot beam antennas, whose radiation patterns are spatially separated, because only in exceptional cases would the transmitted signal emitted by a ground station be transmitted from the antenna in the direction toward the transmitting station.

German Published Pat. application No. 1,803,263, which corresponds to the U.S. Pat. No. 3,646,444, issued to Wolfgang Bitzer on Feb. 29th, 1972, discloses a circuit for the synchronization of digital signals in the pulsed transmission, via communication satellites, where the clock pulse and carrier frequencies of each station are regulated at the respective transmitting ends so that all bursts arrive coherently at the satellite. Each transmitting station is able to recognize its own burst within the pulse frame and to correct its phase.

SUMMARY OF THE INVENTION

It is a principal object of the present invention to provide a circuit arrangement in a transmitting network which enables ground stations to control the phase position of their respective pulse bursts addressed to the various directional transponders in such a manner that the pulse bursts come to lie in distinct, separate time slots without interfering with adjacent pulse bursts.

The foregoing object and other objects, are achieved in accordance with the present invention by a circuit arrangement for synchronizing pulse bursts and pulse frames in the transmission of pulse coded data via directional transponders of a communication satellite using time division multiplexing. The satellite has a number of narrow, or spot, beam directional antennas which cover at least two spatially separated ground stations each disposed within the radiation range and pattern of a respective one of the narrow beam directional antennas. A main transponder in the satellite is associated with an additional antenna which has a radiation range and pattern which covers at least the radiation ranges and patterns of the narrow beam directional antennas. The additional antenna supplies signals received from the ground stations to the main transponder and radiates signals from the main transponder, including synchronizing information signals to the ground stations. Each of the ground stations includes means responsive to the received synchronizing information signals and its own received distinctive pulse bursts for controlling the repetition rate, or frequency, and phase of its distinctive pulse bursts. Thus, all stations participate in the synchronous bit timing operation within the range of the antennas with a given time format.

In accordance with an embodiment of the present invention, a main transponder is provided in the satellite and its associated antenna covers at least the radiation ranges and patterns of the narrow (spot) beam directional antennas. This main transponder is used for the transmission of synchronizing information in such a manner that the main transponder is operated in synchronous bit timing TDMA operation in which each ground station of the entire system participates, so that the bit timing of their respective received "own bursts" can be used at every ground station for the transmission of bursts through the directional transponders with a given time schedule or format. This permits synchronous bit timing operation for the narrow beam directional antennas.

In a further development of the present invention the transmission timing for the directional systems is derived from the clock pulse of the main system in the individual ground stations and corrections in the phase of the burst at each ground station are effected by means of respective burst phase control circuits which are responsive to the signalling information.

This results in a number of advantages. The very efficient transponders which are equipped with narrow beam directional antennas can be utilized to a high degree for the transmission of data while the information required for the bit timing synchronization is handled by the main transponder. Thus, it is no longer necessary to have special burst identification signals accompanying or heading the signal bursts in the directionsl transponders and/or long safety intervals between the bursts from the individual ground stations. The signalling information for the entire system is advantageously exchanged within the pulse frames of the main transponder which itself can also be used, if desired, for the transmission of data bursts.

BRIEF DESCRIPTIONS OF THE DRAWINGS

DESCRIPTION OF THE PREFERRED EMBODIMENTS

Figure 1:
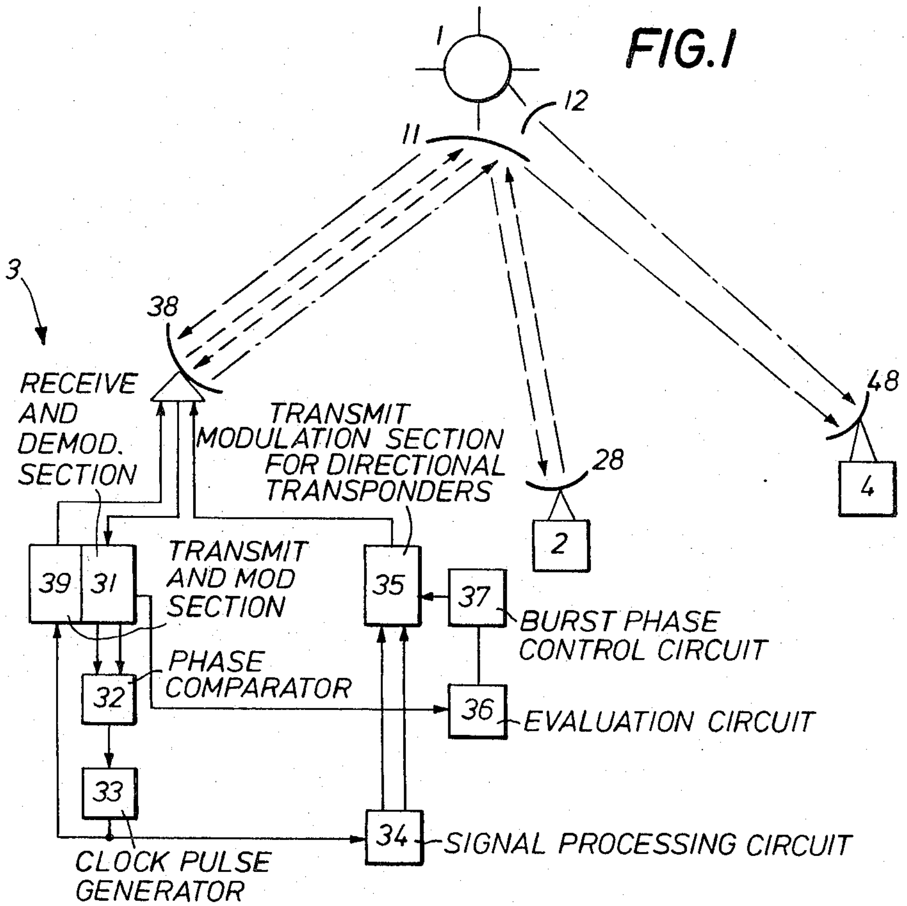
FIG. 1 is a schematic representation of a satellite communication system including a circuit arrangement for synchronizing pulse bursts and pulse frames in accordance with the present invention.

Referring to FIG. 1, an exemplary satellite communication system incorporating a preferred embodiment of the circuit arrangement according to the present invention includes a satellite 1 which contains a plurality of transponders and at least one narrow (spot) beam directional antenna 12 whose radiation range and pattern covers a ground station 4. Additional ground stations 2 and 3, as well as the ground station 4, are situated within the radiation range and pattern of an additional beam directional antenna 11. A burst transmitted from the ground station 2, which operates as a reference station, via its antenna 28 and the main transponder of the satellite 1, is received and demodulated in the receiving and demodulation section 31 of ground station 3. The "own" burst transmitted by station 3 is also recovered in that section 31. The signals having initially different clock pulse repetition rates (frequencies) which are obtained by demodulations, are fed separately from the demodulation section 31 to a phase comparison circuit 32 which furnishes an output voltage proportional to the phase difference of the clock pulses from the two bursts. This output voltage is utilized to regulate the repetition rate of transmitting clock pulses produced in the ground station 3 for the main transponder via a clock pulse generator 33, to cause the output voltage from the phase comparator 32 to become zero. Thus the bit timings of the ground stations 3 and 2 are identical in this station, as well as in the main transponder within the satellite 1. This procedure is effected by every other ground station, including the ground station 4, so that the result is a time multiplex system having synchronous bit timing in the main transponder.

The timing output from the clock pulse generator 33, which is continuously adjusted, is fed to the modulation and transmitting section 39 for the main transponder and into a signal processing circuit 34 for processing the clock pulses. The processing circuit 34 produces the transmitting clock pulses required in the directional transponders for TDMA systems since the individual clock pulse repetition rates (frequencies) need not necessarily coincide with the clock pulse repetition rate (frequency) of the main system using directional antenna 11 of the satellite 1. The derived clock pulse signals having the appropriate rate (frequency) are fed to a modulation and transmitting system 35 of the station 3 for the directional transponders. Similar provisions are made at the other ground stations, such as the ground station 4. Thus, a comprehensive system having synchronous clock pulses is provided which appropriately operates with fixed time markers, for example with the respective beginning of a frame in the main system as the time reference. With a given time schedule or format with respect to a fixed marker within the frame, each ground station knows its transmission time and the maximum transmission period for the individual narrow beam directional systems. If this format shall be changed, for example, during operation with bursts of variable lengths, this will become evident in an evaluation circuit 36 of the station 3 for the signalling channel of the main transponder. This information is fed to a burst phase control circuit 37 in the station 3 which generates the respective signals for changing the transmit positions and periods in the individual frames. These signals are fed to the modulation and transmitting section 35 for the directional transponders. The transmitted bursts are emitted via an antenna 38, which also receives signals from the main transponder in the satellite 1. A burst intended for the ground station 4 is received by the antenna 11 of the satellite 1, is converted and amplified in the corresponding transponder and is beamed via the antenna 12 to the ground station 4 which is provided with an antenna 48.

The ground station 4, as well as additional ground stations, which want to transmit via directional transponders, are equipped in the same manner as station 3.

Concerning the circuits 31, 32, 33 and 39 reference is made to the U.S. Pat. No. 3,646,444. The derivation of the necessary clock pulse frequencies in the processing circuit 34 can be performed by a frequency multiplier and divider network or by specific frequency synthesizers. The evaluation of the signalling channels of the main transponder in the circuit 36 can be done by a simple logic circuit, represented by some shift registers and counters, which compare continuously the instant transmission pattern with that required in the incoming signalling channels. The output signals of that circuit 36 are fed to the burst phase control circuit 37, in which the changing of the burst position and transmission period can be easily accomplished by a set of counters and shift registers.

Figure 2:
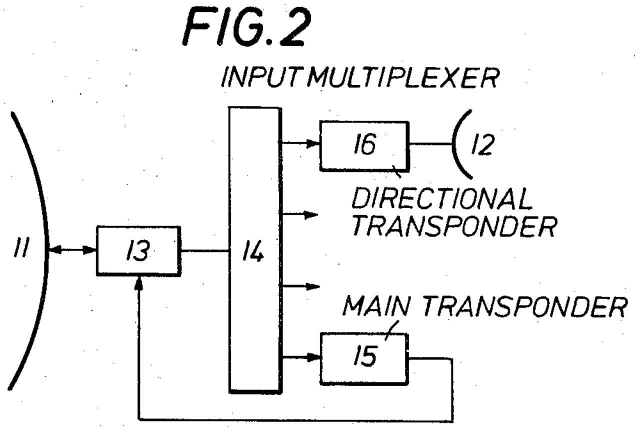
FIG. 2 shows a possible arrangement of main transponder and directional transponder in the satellite.

One possible arrangement of transponders in the satellite 1 is shown in FIG. 2. The transmit signals of all stations are received by directional antenna 11 and are fed into the input frequency multiplexer 14 via the input stage 13. In the multiplexer 14 the TDMA systems are separated and further processed in the different transponders 15 and 16. The output signal of the main transponder 15 is transmitted via the antenna 11 to all participating ground stations, whereas the output signal of the directional transponder 16 is transmitted via the spot beam antenna 12 to a specific area.

It will be understood that the above description of the present invention is susceptible to various modifications, changes and adaptations, and the same are intended to be comprehended within the meaning and range of equivalents of the appended claims.

I claim:

1. In a circuit arrangement, for synchronizing pulse bursts and pulse frames in the transmission of pulse coded data between ground stations via directional transponders of a communication satellite using time division multiplexing, the satellite having spot beam directional antennas covering at least two spatially separated ground stations each disposed within the radiation range and pattern of a respective one of the directional antennas, the improvement comprising:

main transponder means in said satellite; an additional antenna having a radiation range and pattern which covers at least the radiation ranges and patterns of said directional antennas, said additional antenna being coupled to said main transponder means for supplying received signals from said ground stations thereto and for radiating signals received therefrom, including synchronizing information signals to said ground stations; and means at each said ground station responsive to received synchronizing information signals and to its own received distinctive pulse bursts for controlling the repetition rate and phase of its distinctive pulse bursts; whereby all said stations participate in the synchronous bit timing operation within the range of the antennas with a given time format.

2. A circuit arrangement as defined in claim 1, wherein said means for controlling the repetition rate and position of the pulse bursts includes a clock pulse generator and a phase comparator, said clock pulse generator having its input coupled to said phase comparator and being responsive to output signals therefrom.

3. A circuit arrangement as defined in claim 2, wherein said means for controlling the repetition rate and position of the pulse bursts includes signal evaluating means for deriving signaling information signals at each ground station to develop a control signal output, and burst phase control circuit means coupled to said signal evaluating means and responsive to its control signal output for regulating the phase of the pulse bursts.

* * * * *